Sept. 3, 1929.　　　　K. TUTE　　　　1,726,871

DEVICE FOR SECURING FLEXIBLE PIPES

Filed Feb. 29, 1928

Inventor:
Karl Tute

Patented Sept. 3, 1929.

1,726,871

UNITED STATES PATENT OFFICE.

KARL TUTE, OF BERLIN-SCHONEBERG, GERMANY.

DEVICE FOR SECURING FLEXIBLE PIPES.

Application filed February 29, 1928, Serial No. 258,019, and in Germany July 12, 1927.

My invention relates to a device for securing flexible pipes, for instance, rubber tubes, on metal pipes by means of a flexible band surrounding the pipe to which tension is imparted for exerting radial pressure on the flexible pipe so as to hold it in position on the metal pipe. It is an object of my invention to improve a device of this kind with a view to simplification and to this end I so design it that the means for exerting tension on the band also serves as locking means for preventing the band from becoming loose.

In devices of this kind as heretofore designed one end of the band is secured to the body of the device, the other end to a part by which tension can be exerted on the band, and separate means such as toggle or other levers, pawls, ratchet wheels, screws, etc., are provided for locking such tension-exerting part. Such separate locking means involve complication and expense, they require a certain skill on the part of the operator, and are still not reliable as they are readily rendered inactive by careless handling or by vibration.

As compared with a device of the old type, the new device according to this invention is very cheap and simple and readily manipulated as separate locking means are dispensed with altogether. Notwithstanding this, it is extremely reliable.

It comprises a bracket to which one end of the band is secured, a rotary pin in the bracket and a bar on the bracket about one edge of which the band is stretched by rotating the pin.

In the drawing affixed to this specification and forming part thereof, a device embodying my invention is illustrated diagrammatically by way of example.

In the drawing

Figure 1:
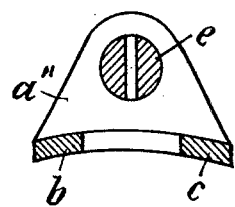
Fig. 1 is a sectional elevation of the device on the line A—B in Fig. 2.
Figure 2:
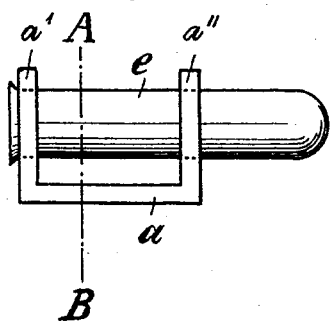
Fig. 2 is an elevation.
Figure 3:
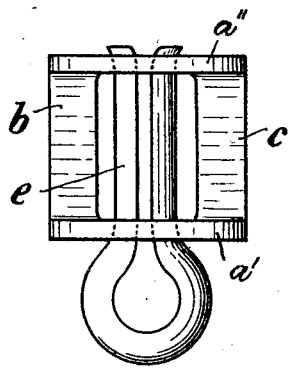
Fig. 3 is a plan view.
Figure 4:
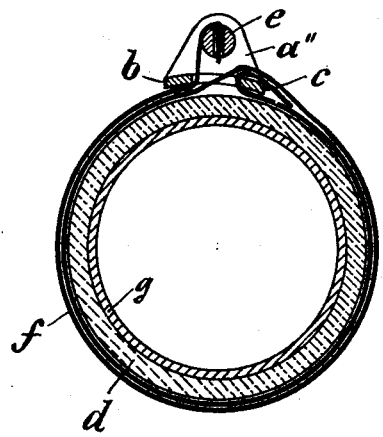
Fig. 4 shows the device in position on a rubber tube, drawn to a smaller scale.

Referring to the drawing, the device comprises a U-shaped bracket $a$ with an upwardly projecting lug $a'$, $a''$ at either end, and two bars $b$, $c$ with which the bracket is placed on a flexible tube $d$, Fig. 4, on a pipe $g$. The seat of the bracket $a$ may be straight but is preferably curved as shown in Fig. 1 so as to fit the tube $d$ more closely.

$e$ is a pin which is carried to rotate in the lugs $a'$, $a''$ of the bracket $a$ and is slotted between the lugs for the reception of the free end of the band $f$ which serves for securing the rubber tube $d$, one end of the pin being provided with a head projecting from the lug $a''$ and the other having an eye for the insertion of a lever or other tool. Preferably, the pin is bent from steel of semi-circular section in the manner of a split ring.

The diameter of the pin $e$ and the clearance between the bars $b$, $c$, or, rather, the edge of that bar about which the band is taken to the pin $e$, are correlated so that the reach of the band between the edge of the bar about which the band is stretched, in the present instance the bar $b$, is substantially vertically below the corresponding side of the pin $e$. It makes no difference which of the bars $b$, $c$ the end of the band $f$ is attached to, and if, as shown in Fig. 4, the band is attached to the bar $c$ and stretched about the edge of the bar $b$, the bar $c$ might be made wider so that its edge is not vertically, or substantially so, below the side of the pin $e$. In other words, it is only important that one of the edges of a bar should be in the defined relation to the corresponding side of the pin $e$.

When the band $f$ has been attached to the bar $c$, it is taken about the rubber tube $d$ in a single layer or in any number of layers, and its free end is stretched about the inner edge of the other bar $b$, and placed into the slot of the pin $e$. By rotating the pin $e$, the band $f$ is firmly stretched about the rubber tube $d$, and at the same time is held on the perimeter of the pin $e$ under considerable pressure. Slipping of the band is prevented by the sharp kink at the point where it is inserted in the slot of the pin $e$. Upon further rotation of the pin $e$ the band is stretched more tightly, causing the bar $c$ to hug tightly the tube $d$, and reducing the distance of the pin $e$ from the tube by compressing the material of the tube. This, in turn, causes the bar $b$ to exert an ever increasing reaction on the band $f$ which under the action of the substantially vertical pull between the side of the pin and the edge of the bar is sharply bent at an angle which is only slightly larger than 90 degs. As the band is sharply bent about the edge of the bar $b$ and about the pin $e$ where it enters its slot, and as pressure is exerted on the band at the bar $b$ and it exerts strong frictional reaction on the perimeter of the pin, it is held taut with great reliability so that shocks exerted on the bracket $a$ or frequent vibration cannot shake loose the device. If under any influence, the pin *e* is accidentally rotated in opposite direction to that in which it exerts a pull on the band, the sharp bend at the inner edge of the bar *b* will not yield, on the contrary, the band will become buckled above the bar *b* so that the angle at this point will become more acute.

I wish it to be understood that I do not desire to be limited to the exact details of construction shown and described for obvious modifications will occur to a person skilled in the art.

I claim:—

1. A device for securing flexible pipes comprising a bracket, a pin in said bracket, a bar in said bracket, and a band adapted to be placed about said flexible pipe, attached to said bracket at one end and to said pin at the other, and to be stretched about the edge of said bar, the edge of said bar about which the band is stretched, and the adjacent side of said pin being arranged substantially vertically above each other.

2. A device for securing flexible pipes comprising a bracket, a pin in said bracket, a pair of bars in said bracket, the edge of one of said bars being substantially vertically below the corresponding side of said pin, and a band attached to one of said bars at one end and to said pin at the other and stretched about the edge of that bar which is in the said vertical position with respect to the side of said pin.

In testimony whereof I affix my signature.

KARL TUTE.